United States Patent [19]
Soeters

[11] Patent Number: 5,106,143
[45] Date of Patent: Apr. 21, 1992

[54] SNAP-IN FLOOR CONSOLE

[75] Inventor: Robert J. Soeters, Holland, Mich.

[73] Assignee: Prince Corporation, Holland, Mich.

[21] Appl. No.: 576,279

[22] Filed: Aug. 31, 1990

[51] Int. Cl.⁵ .................................................. B60R 7/04
[52] U.S. Cl. ...................... 296/37.8; 224/42.45 R;
    292/303; 248/221.4; 248/222.2
[58] Field of Search ............... 296/37.8, 37.14, 37.7;
    224/273, 275, 42.32, 42.45 R; 403/353;
    292/303, 91, 80, 87, 19; 248/221.4, 222.2

[56]           References Cited
         U.S. PATENT DOCUMENTS

| | | | |
|---|---|---|---|
| 1,790,977 | 2/1931 | De Boer | 248/221 |
| 2,864,578 | 12/1958 | Margulis | 248/221 |
| 3,022,107 | 2/1962 | Daniels | 296/37 |
| 3,165,222 | 1/1965 | Sentlinger | 224/42 |
| 3,330,518 | 7/1967 | Adler | 248/221 |
| 3,356,409 | 12/1971 | Belsky et al. | 224/275 X |
| 3,642,122 | 2/1972 | Von Ende | 206/19 |
| 3,799,483 | 3/1974 | Chiappinelli | 296/37.8 X |
| 3,870,210 | 3/1975 | Trammell, Jr. | 224/42.45 R |
| 4,256,280 | 3/1981 | McCutchen | 248/220 |
| 4,612,603 | 9/1986 | Cook | 361/419 |
| 4,690,241 | 9/1987 | Miyadera | 296/37.8 X |
| 4,690,448 | 9/1987 | Fujisawa | 296/37 |
| 4,691,960 | 9/1987 | Miyadera | 296/37 |
| 4,697,774 | 10/1987 | Sarton et al. | 248/221 |
| 4,719,542 | 1/1988 | Lemmer | 361/417 |
| 4,783,110 | 11/1988 | Beukema et al. | 296/37 |
| 4,796,791 | 1/1989 | Goss et al. | 224/275 |
| 4,818,010 | 4/1989 | Dillon | 296/37.7 |
| 4,821,931 | 4/1989 | Johnson | 224/42 |
| 4,844,533 | 7/1989 | Dowd et al. | 296/37.8 X |
| 4,921,445 | 5/1990 | Herbert | 248/221.4 X |
| 4,953,030 | 8/1990 | Seo | 248/221.4 X |

FOREIGN PATENT DOCUMENTS 158140 9/1982 Japan ..................... 224/42

Primary Examiner—Margaret A. Focarino
Assistant Examiner—Joseph D. Pape
Attorney, Agent, or Firm—Price, Heneveld, Cooper, DeWitt & Litton

[57]           ABSTRACT

A floor mounted snap-in console includes a first forward pair of mounting brackets with one bracket mounted to the vehicle floor and the other mounted to a front end of the console for extending into the first bracket. The console further includes a second pair of rear mounting brackets with one of these brackets mounted to the vehicle floor and the other mounted to the rear of the console. The second set of brackets snap together and include posts for deflecting arms of one of the brackets to release their interconnection for removing the console.

17 Claims, 2 Drawing Sheets

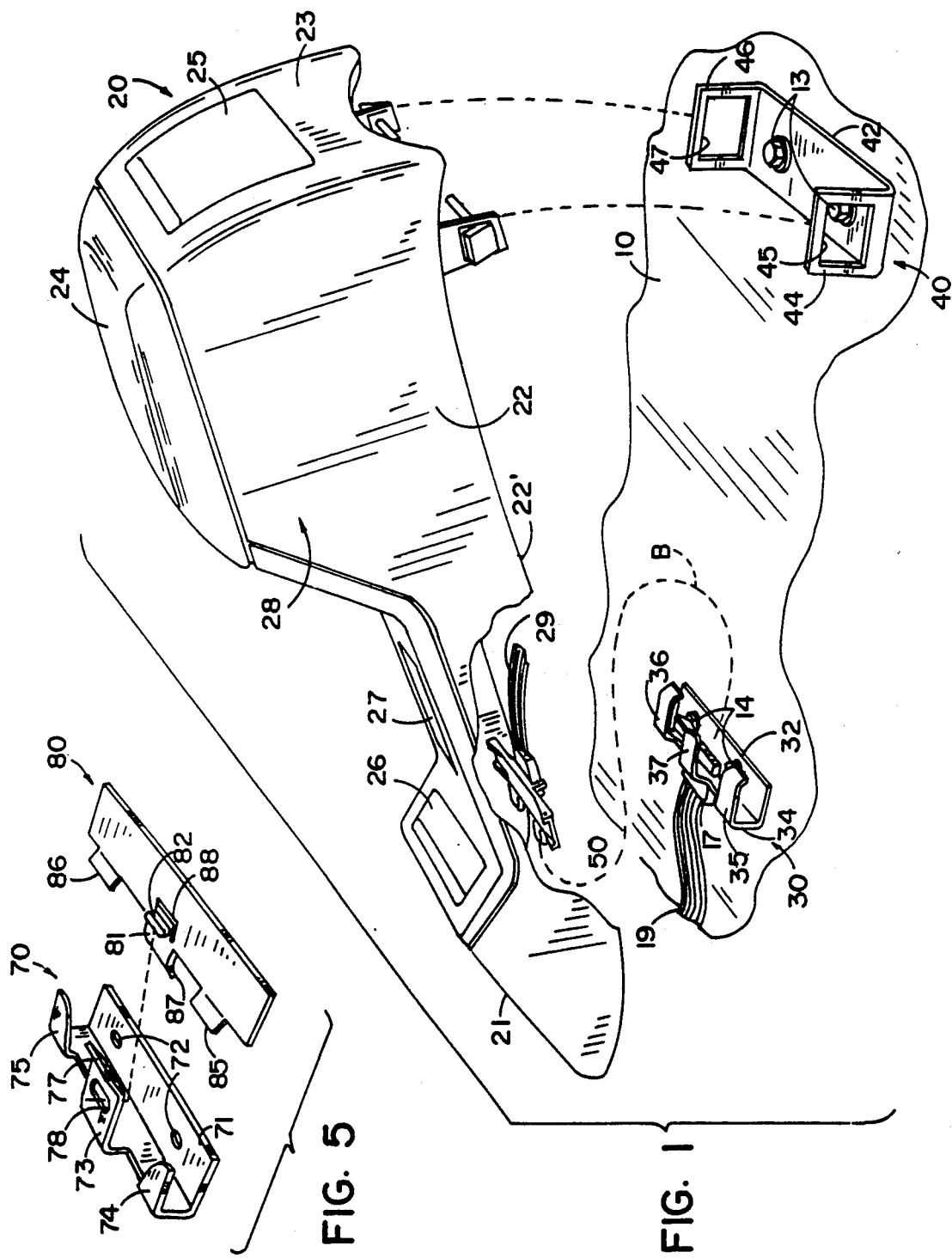

SNAP-IN FLOOR CONSOLE

BACKGROUND OF THE INVENTION

The present invention pertains to a floor console for a vehicle and particularly to a floor console which can be snap fitted to a vehicle floor for ease of installation and removal.

Floor consoles used in vehicles typically include a variety of accessories; such as, armrests with storage compartments, cup holders, ashtrays, and the like. Usually, such consoles are mounted to a vehicle by brackets which are fastened to the floor of the vehicle by bolts or other fasteners, and once installed they are intended to be removed. During manufacturing of the vehicle, installation of such consoles requires tools for securing the fastening devices and a degree of care to avoid damage to the finished and upholstered console.

U.S. Pat. No. 4,783,110 issued Nov. 8, 1988, and assigned to the present assignee discloses an overhead console which uses a pair of universal mounting brackets which allow the snap fitting of an overhead console to the vehicle roof. It relies upon the hanging force of the console to engage teeth associated with the bracket for maintaining its installed position. Thus, although the snap-in console of the overhead system is an improved construction compared to the use of threaded fasteners, its construction is not applicable to floor-mounted consoles.

SUMMARY OF THE PRESENT INVENTION

The system of the present invention provides an improved console mounting system particularly adapted for use in connection with floor-mounted consoles and one in which first and second mounting brackets are provided for mounting to the vehicle floor in spaced relationship to each other. Third and fourth mounting brackets are secured to the vehicle console for, the snap-in attachment of the console to mounting brackets on the vehicle. In a preferred embodiment, one of the first and second brackets provides a tongue-and-groove type interconnection to one end of the console which can then be pivoted downwardly to snap in at the opposite end. In a preferred embodiment also, one of the mating interconnecting brackets provides electrical interconnection between the vehicle's electrical supply system and accessories which may be mounted in the console. In a preferred embodiment of the invention also, one of the brackets includes at least one resilient arm with means for deflecting the arm for unlocking the snap-in bracket for easy removal of the console.

These and other features, objects, and advantages of the present invention will become apparent upon reading the following description thereof, together with reference to the accompanying drawings in which:

BRIEF DESCRIPTION OF THE DRAWINGS

FIG. 1 is a fragmentary perspective view, partly broken away, of a vehicle including a console and a mounting system embodying the present invention;

FIG. 5 is a perspective view of an alternative front-mounting bracket pair.

DETAILED DESCRIPTION OF THE PREFERRED EMBODIMENTS

Figure 4:
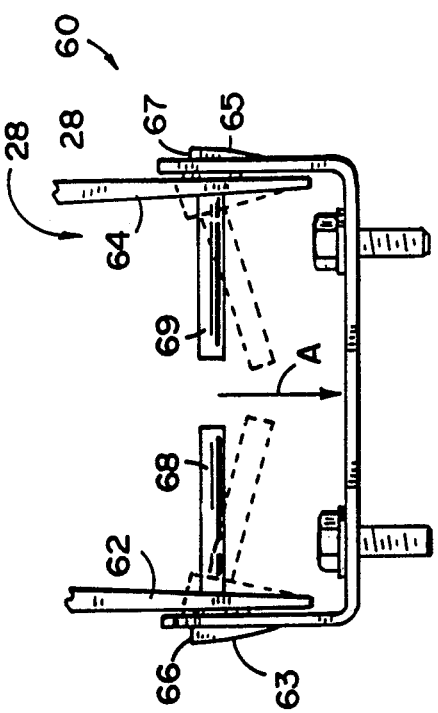
FIG. 4 is an enlarged rear elevational view of the rear mounting bracket assembly shown in FIG. 1.

Referring initially, to FIG. 1, there is shown the floor area 10 of a vehicle such as an automobile and particularly the area between the front seats of the vehicle which can accommodate a console 20 incorporating the mounting system of the present invention. Console 20 includes an outer molded integral shell 28 defining left and right sides 22 of the console, as well as an integral forward sloping front wall 21 and a rear wall 23. Mounted at the top of the console is a padded armrest member 24, while positioned within rear wall 23 is an ashtray 25 of generally conventional construction. The center of the saddle-shaped console 20 may include a second ashtray 26 for front seat passengers and a storage opening 27 for a variety of items. The armrest 24 preferably opens to a storage compartment 28 (FIG. 4) providing storage for various items as well. Thus, armrest 24 typically will be pivotally mounted by suitable hinges to the sides or rear wall 23 of the integral armrest 20. Armrest 20 can be molded of a suitable polymeric material such as ABS, polypropylene, polyvinylchloride, or the like.

Typically, the ashtrays 25 and 26 will also include lighters associated therewith, and the console 20 may include other electrical accessories such as light units or control switches for various functions. For such purpose, the mounting system of the present invention also provides for the electrical interconnection of a wiring harness 29 associated with the console and the various electrical components mounted therein to a wiring harness 19 associated with the vehicle. Wiring harness 19, which extends to the vehicle's power supply, terminates in a connector 17 mounted to a first or front mounting bracket.

The first or front lower mounting bracket 30 of the present invention is generally U-shaped having a base leg 32, an upstanding forward wall 34, and a bifurcated set of outer rearwardly and downwardly depending legs 35 and 36. Between legs 35 and 36 there is provided an upper rearwardly and upwardly extending center leg 37. Thus, the ends of each of legs 35, 36, and 37 have curved lips which provide guide means for the entry of the male mounting bracket associated with console 20 as described below. Wiring harness 19 terminates in the connector such as plug 17 which is secured to the wall 34 of bracket 30 in a conventional manner such as by snap-fitting within an aperture in the wall. The base leg 32 of bracket 30 includes a pair of spaced apertures for receiving fastening members such as sheet metal bolts 14 which secure the first or front female bracket 30 to the floor 10 of the vehicle prior to the installation of the console 20.

Mounted to the vehicle floor 10 in spaced and aligned relationship rearwardly of bracket 30 is a second or rear mounting bracket 40 which is generally U-shaped including a floor 42 and upstanding side walls 44 and 46, each of which generally including an enlarged rectangular aperture 45 and 47, respectively, for receiving snap-in fastening means associated with the console. Bracket 40 is spaced generally on the same longitudinal line in the vehicle as bracket 30 and also includes apertures for receiving fastening bolts 13 securing the bracket to the floor 10 of the vehicle.

Figure 3:
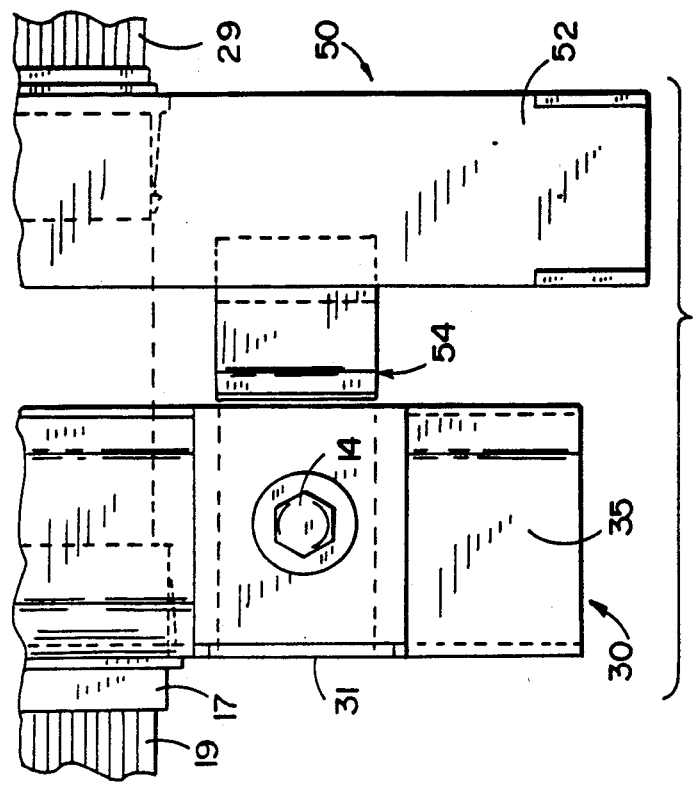
FIG. 3 is a fragmentary top plan view of a portion of the structure shown in FIG. 2.
Figure 2:
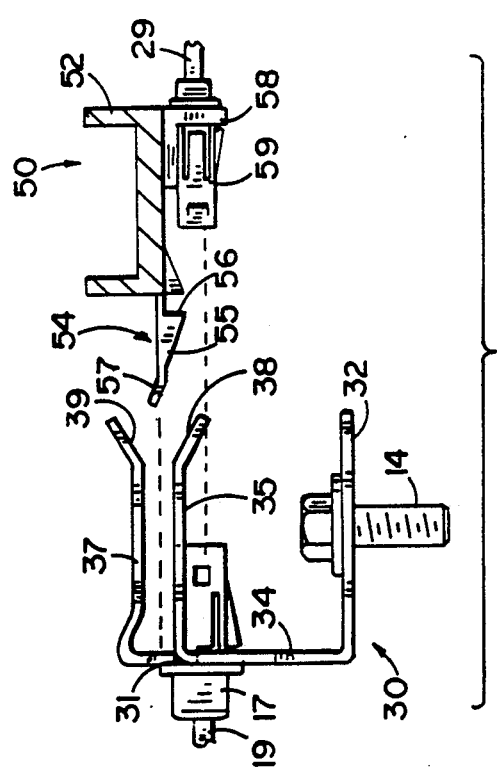
FIG. 2 is an enlarged left-side elevational view, partly in cross-section, of the front pair of mounting brackets shown in FIG. 1.

Referring now to FIGS. 2 and 3, the first or front female bracket 30 is shown in greater detail, as is its mating bracket 50 which is mounted between the sides of console 20. These Figures also show the upper and lower legs 35 and 37 showing the ends 38 and 39, respectively, which define a V-shaped opening for the receipt of the third mounting bracket 50 associated with the forward portion of console 20. Bracket 50 includes a generally U-shaped crossbeam 52 which extends between the sides 22 of console 20 and is secured thereto in a conventional manner near the lower edge 22' of the console to position the bracket in the proper vertical location with respect to bracket 30 mounted to the vehicle floor. Extending forwardly from the front edge of U-shaped crossbeam 52 is a pair of arrowhead-shaped catches 54 which include a downwardly- and rearwardly-inclined surface 55 terminating in a sharp vertical rise 56. Each catch also has a forwardly and upwardly extending lip 57 (FIG. 2) to facilitate entry into bracket 30 by camming against lip 38 of this mounting bracket. Catches 54 extend over and snap to ledge means 31 (FIGS. 2 and 3) which is the top edge of wall 34 of bracket 30 between legs 35 and 37 and legs 37 and 36 and which is vertically located between these legs. An L-shaped mounting member 58 is secured to the underside of crossmember 52 and receives a connector 59 which mates with and engages connector 17 for electrically interconnecting the wire harness 29 of the console 20 with the wire harness 19 of the vehicle when bracket 50 is snap-fitted and plugged into bracket 30.

The fourth or rear mounting bracket 60 is mounted to the console and interconnects and snap-fits within bracket 40. Bracket 60 includes a pair of spring arms 62 and 64 which are resilient arms mounted to the inside edges of sidewalls 22 of console 20. Arms 62 and 64 project downwardly and include arrowhead-shaped catches 63 and 65, respectively, which extend outwardly from the sides of the arms. Catches 63 and 65 extend over the top edges of sides 44 and 46 of bracket 40 until the horizontal edges 66 and 6 of catches 63 and 65, respectively, snap under and engage the upper edge of the rectangular apertures 45 and 47, respectively, of bracket 40. Extending inwardly from the sides of arms 62 and 64 are tabs 68 and 69 which are employed for the easy removal of the console 20 if necessary. This is accomplished by pushing downwardly on these tabs as indicated by arrow A in FIG. 4 which urges the catches 63 and 65 out of apertures 45 and 47 as shown in phantom form in FIG. 4 such that the rear end of console 20 can be raised and subsequently removed by pushing rearwardly to disengage the front mounting brackets.

During installation, therefore, as best seen in FIG. 1, the tines of the front mounting bracket 30 provide a guide for the receipt of the pair of spaced catches 54 of bracket 50 leading it into a locked position with the catches engaging the lips 31 of bracket 30. At the same time, the electrical connector 59 engages and interconnects with connector 17. Subsequently, the rear end of the console 20 is pushed downwardly until the spring-loaded arms 62 and 64 have their catches 63 and 65 snap-fit and engage the rear mounting bracket 40. This completes the installation of the console which can be accomplished rapidly in the assembly line environment. If removal of the console is desired, the pivoted cover 24 of the armrest is raised and tabs 68 and 69 depressed as described above for disengaging the rear end of the console, which is then lifted upwardly and rearwardly to remove the console from the vehicle. The compartment 28 of the armrest may include a removable bin to gain access to the tabs 68 and 69 of the upper rear mounting bracket 60, or the tabs may be accessed by the removal of the ashtray assembly 25 in a conventional manner.

As an alternative to the front mounting bracket assemblies 30 and 50, brackets 70 and 80 shown in perspective view in FIG. 5 may be provided. Bracket 70 includes apertures 72 formed in its floor 71 for securing the bracket in the same position as bracket 30 in a vehicle. Bracket 70 includes a bifurcated construction as well, with a center tine 73 extending between the spaced end tines 74 and 75 like bracket 30. These tines are vertically spaced to define a slot into which bracket 80 can be extended during assembly and removal. Tine 73 includes an upwardly inclined tip 77 and an elongated aperture 78 for receiving a vertically extending catch 82 formed in a center tine 81 of bracket 80. The inner edges of tines 74 and 75 are curved to assist in the installation of the console. Bracket 80, like bracket 50, is secured between the sidewalls 22 of the armrest to position tine 81 in general alignment with tine 73 of bracket 70. Tine 81 includes a downwardly-inclined lip 87 which facilitates its guided installation as it engages surface 77 of bracket 70, thereby deflecting the arm 73 as well as arm 81 slightly to allow the insertion and snap engagement of the vertically-extending catch or post 82 into slot 78. Bracket 80 further includes a pair of upwardly-inclined tines 85 and 86 which are spaced to extend in the slots between tines 74 and 73 and 73 and 75, respectively, of bracket 70. To improve the resiliency of tine 81 and facilitate its installation, a U-shaped slot 88 is formed around a portion of the upwardly extending locking post 82 near the junction of tine 81 with the floor of bracket 80. Each of the brackets 30, 40, and 70 is preferably made of a metal stamping which can be formed by progressive dies. Brackets 50, 60, and 80 however, are made of a suitable polymeric material and may be integrally formed in some embodiments with the shell forming the console. All of the brackets may, however, be optionally molded of suitable structural polymeric material providing sufficient structural rigidity for the mounting of the console to the vehicle floor.

These and various other modifications to the preferred embodiments of the invention as described herein can be made by those skilled in the art without departing from the spirit or scope thereof as defined by the appended claims.

The embodiments of the invention in which an exclusive property or privilege is claimed are defined as follows.

1. A snap-in floor console for a vehicle comprising:
a console body;
a first mounting bracket including means for mounting said first mounting bracket to the floor of a vehicle, said first mounting bracket including at least a pair of spaced legs defining an opening facing in a generally horizontal direction and ledge means for receiving a catch of a mating bracket;
a second mounting bracket mounted to said console body, said second mounting bracket including catch means for lockably engaging said ledge means of said first mounting bracket when said second mounting bracket is inserted into said opening of said first mounting bracket;
a third mounting bracket including means for mounting said third mounting bracket to the floor of a vehicle in spaced relationship and aligned with said first mounting bracket, said third mounting bracket being generally U-shaped having a floor and upstanding end walls extending from opposite ends of said floor and including apertures extending therein; and a fourth mounting bracket mounted to said console body in spaced relationship to said second mounting bracket such that said third and fourth brackets align, said fourth mounting bracket comprising a pair of resilient arms having catches extending outwardly therefrom for engaging edges of said apertures in said third mounting bracket, and means for deflecting said arms to disengage said catches of said fourth mounting bracket from said third mounting bracket for removal of said console body from a vehicle.

2. The apparatus as defined in claim 1 wherein said first mounting bracket comprises a floor, a front wall extending upwardly from said floor, a first pair of legs extending rearwardly from opposite ends of said front wall, and a center leg horizontally and vertically spaced from said first pair of legs to define said opening.

3. The apparatus as defined in claim 2 wherein said catch means of said second mounting bracket comprises a pair of forwardly extending legs spaced to extend between said first pair of legs of said first mounting bracket and said center leg of said first mounting bracket and each including an arrowhead-shaped end for engaging said ledge means of said front wall of said first mounting bracket.

4. The apparatus as defined in claim 2 wherein said center leg of said first mounting bracket includes an aperture formed therein and wherein said catch means of said second mounting bracket includes a leg aligned with said center leg of said first mounting bracket and an upstanding post for extending into said aperture of said center arm to latch said second mounting bracket to said first mounting bracket.

5. The apparatus as defined in claim 4 wherein said console body includes a central opening and wherein said means for deflecting said arms of said fourth mounting bracket extend into and are accessible from said central opening.

6. The apparatus as defined in claim 5 wherein said means for deflecting said arms of said fourth mounting bracket comprises inwardly-extending posts integrally formed on said arms of said fourth mounting bracket.

7. The apparatus as defined in claim 6 wherein said arms of said fourth mounting bracket are secured to the sides of said console body.

8. The apparatus as defined in claim 7 wherein said second mounting bracket is mounted to said console body near a first end thereof and said third mounting bracket is mounted to said console body near an opposite end.

9. The apparatus as defined in claim 1 wherein one of said first and second or third and fourth mounting brackets includes interconnecting electrical connectors.

10. The apparatus as defined in claim 1 wherein said first mounting bracket includes a generally vertically extending wall and said at least a pair of spaced legs include a bifurcated structure in which a pair of upper legs extend outwardly and in horizontally spaced relationship from said wall and a lower leg extends outwardly from said wall in horizontally and vertically spaced relationship to said upper legs.

11. The apparatus as defined in claim 10 wherein said upper legs terminate in upwardly inclined ends and said center leg terminates in a downwardly-inclined end to define a V-shaped opening.

12. A snap-in floor console for a vehicle comprising:
a console body including a forward mounting bracket including at least a pair of spaced legs defining catch means facing in a generally horizontal direction for lockably engaging a mating bracket mounted to the floor of a vehicle, said console further including a rear mounting bracket including a pair of downwardly-extending resilient arms including catch means extending therefrom for lockably engaging another mating bracket mounted to the vehicle such that said console can be snap-fitted to the mating brackets of the vehicle for ease of installation and removal wherein said resilient arms of said rear mounting bracket include inwardly-extending post means to facilitate the deflection of said arms to disengage the another mating bracket mounted to the vehicle.

13. The apparatus as defined in claim 1 wherein said forward mounting bracket includes an electrical connector for electrically connecting to a mating electrical connector in the mating bracket of the vehicle.

14. A snap-in floor console for a vehicle comprising:
a console body including a forward mounting bracket including at least a pair of spaced legs defining catch means facing in a generally horizontal direction for lockably engaging a mating bracket mounted to the floor of a vehicle, said console further including a rear mounting bracket including a pair of downwardly-extending resilient arms including catch means extending therefrom for lockably engaging another mating bracket mounted to the vehicle such that said console can be snap-fitted to the mating brackets of the vehicle for ease of installation and removal, wherein said resilient arms of said rear mounting bracket include inwardly-extending posts to facilitate the deflection of said arms to disengage the another mating bracket mounted to the vehicle, and wherein said forward mounting bracket includes an electrical connector for electrically connecting to a mating electrical connector in the mating bracket of the vehicle.

15. The apparatus as defined in claim 14 and further including an access opening formed in said console for gaining access to said posts.

16. A snap-in floor console system for a vehicle comprising:
a console body including a forward mounting bracket including at least a pair of spaced legs defining catch means facing in a generally horizontal direction;
a mating bracket including means for mounting said mating bracket to a vehicle floor, said mating bracket including an opening extending generally horizontally for lockably receiving said forward mounting bracket;
said console body further including a rear mounting bracket including a pair of downwardly-extending resilient arms including catch means extending therefrom and post means for deflecting said arms; and
another mounting bracket including means for mounting said another mounting bracket to the vehicle floor in spaced relationship to said first named mounting bracket, said another mounting bracket lockably engaging said rear mounting bracket such that said console can be snap-fitted to said mating brackets of the vehicle for ease of installation and removal.

17. The apparatus as defined in claim 16 wherein at least one of said forward or rear mounting brackets includes an electrical connector mounted thereto for coupling to a wire harness associated with said console, and wherein a mating one of said mating mounting brackets mounted to the vehicle includes an electrical connector for coupling to said first-named connector when said console is mounted to the vehicle for coupling said wire harness of said console to the electrical system of the vehicle.

* * * * *